United States Patent [19]
Strause et al.

[11] Patent Number: 6,061,492
[45] Date of Patent: May 9, 2000

[54] APPARATUS AND METHOD FOR INTERCONNECTING FIBER CABLES

[75] Inventors: Kevin L. Strause, Keller; Robert A. Burrous, Coppell, both of Tex.

[73] Assignee: Siecor Corporation, Hickory, N.C.

[21] Appl. No.: 08/838,556

[22] Filed: Apr. 9, 1997

[51] Int. Cl.$^7$ ................................................ G02B 6/36
[52] U.S. Cl. .................... 385/135; 385/134; 385/136; 385/137
[58] Field of Search .................... 385/134, 135, 385/137, 136

[56] References Cited

U.S. PATENT DOCUMENTS

| | | | |
|---|---|---|---|
| 4,765,709 | 8/1988 | Suillerot et al. | 385/135 |
| 4,884,862 | 12/1989 | Kofod | 385/55 |
| 5,247,603 | 9/1993 | Vidacovich et al. | 385/135 |
| 5,535,298 | 7/1996 | Fanacht et al. | 385/135 |
| 5,706,384 | 1/1998 | Peacock et al. | 385/135 |
| 5,740,298 | 4/1998 | Macken et al. | 385/135 |
| 5,835,660 | 11/1998 | Jung et al. | 385/137 |
| 5,870,519 | 2/1999 | Jenkins et al. | 385/135 |

*Primary Examiner*—Rodney Bovernick
*Assistant Examiner*—Ellen E. Kim

[57] ABSTRACT

A apparatus and method are provided to provide a readily rearrangeable interconnection point between two fiber cables. A panel has a series of trays for holding joined fiber pairs. One of the cables is fanned out in equal length fanout tubes and fiber guides are located such that any fanout tube can be routed with its slack managed to any tray in the series of trays. As such, rearrangement of the fanout tubes along the series of trays is readily achieved. The complements of the other cable are routed to the other side of the trays. Inside the trays, the individual fibers are routed to joint holders. The trays are pivotally attached to the panel and hang at a downward angle. The trays are pivotable upward to allow access to lower trays. Opposed fibers are joined and the resulting joint is stored in the trays.

17 Claims, 10 Drawing Sheets

APPARATUS AND METHOD FOR INTERCONNECTING FIBER CABLES

TECHNICAL FIELD OF THE INVENTION

The present invention relates to an optical fiber distribution apparatus and method for providing a readily rearrangeable interconnection point directly between two fiber cables.

BACKGROUND OF THE INVENTION

In telecommunication networks from a telecommunication company's central office to its subscribers, existing copper installations are being replaced with optical fiber out to a plurality of fiber nodes that convert the optical signals to electrical signals for transmission to the subscriber over copper drops. As more fiber nodes are added to networks, it becomes increasingly difficult for the central office to handle all the distribution needs of the network. In order to move fiber distribution downstream of the central office into the network, commonly used central office type fiber distribution frames can be used; however, such frames require large amounts of space and even larger cabinets and vaults to house them. They also use jumpers interposed between the feeder cable and distribution cable to allow for reconfigurations. Besides increasing the amount of space needed, the use of jumpers adds another connection point that contributes to connection loss in the network. Other types of fiber interconnection products such as splice closures are limited to mating complements of the feeder cable to complements of the distribution cable and any reconfiguration is limited to fibers within the same complement.

Accordingly a need exists for a fiber distribution apparatus that can be used downstream of the central office to provide a flexible point of demarcation between feeder fibers from the central office and distribution fibers leading to optical nodes. More specifically, a need exists for a compact fiber distribution apparatus that allows any distribution fiber to be joined to any feeder fiber whether at initial installation or later reconfiguration and without the need for jumpers or large space requirements.

SUMMARY OF THE INVENTION

The present invention provides a fiber distribution interface apparatus that in its various aspects can have the advantages of 1) high density of connections between distribution and feeder fibers, 2) ease of disconnecting and reconnecting distribution/feeder joints to effect changes in the network 3) the flexibility to connect any one feeder fiber to any one distribution fiber regardless of what complement (ganged group of fibers in a cable) either fiber comes from, 4) achieving such flexibility in making/changing connections without jumpers, 5) achieving such with minimum fiber movement, 6) achieving such with simple initial installation—constant length buffer tube fanouts, and 7) accommodating variety of joining and storage options.

Specifically, one aspect of the present invention provides a method of interposing a readily rearrangeable interconnection point between a first fiber cable and a second fiber cable. An end of the first fiber cable is routed to a panel. The first fiber cable has a plurality of first fiber complements and each first fiber complement has a plurality of first fibers. A series of subsets of the plurality of first fiber complements is routed to a corresponding series of trays mounted on the panel. The first fibers of each subset are routed to joint locations in the subset's respective tray.

An end of the second fiber cable is routed to the panel. The second fiber cable has a plurality of second fiber complements and each second fiber complement has a plurality of second fibers. The second fibers from the second fiber complements are fanned out to create equal length fanout tubes containing at least one fiber. At least a first portion of the fanout tubes are routed to the series of trays. The second fibers in the first portion of fanout tubes are routed to joint locations in the tray. The first portion of the second fibers are joined to corresponding first fibers to create fiber joints, and the fiber joints are located in the trays.

Another aspect of the present invention is an interconnection apparatus for providing a readily rearrangeable interconnection point between a first fiber cable and a second fiber cable. Each fiber cable is of the type having multiple complements of multiple fibers. The apparatus comprises a panel and a series of splice trays. Each splice tray is pivotally mounted to the panel defining a pivot axis. An array of fanout blocks is mounted on the panel. Each fanout block has a complement end for receiving a complement and a fanout end opposite thereto. A plurality of equal length fanout tubes extend from the fanout ends of the array of fanout blocks. A series of fiber guides are located relative to the series of trays and relative to the fanout blocks such that any fanout tube can be routed to any tray without unmanaged slack by routing the fanout tube through the appropriate number of fiber guides before routing the fanout tube to a particular tray.

Another aspect of the present invention is a stubbed interconnection apparatus that provides a readily rearrangeable interconnection point between a first fiber cable and a second fiber cable. Each fiber cable is of the type having multiple complements of multiple fibers. The apparatus comprises a panel and a stack of splice trays. Each splice tray is pivotally mounted to the panel defining a pivot axis. A cable stub installed in the apparatus has a first end for splicing to the first cable, a second end opposite thereto for splicing to the second cable, and a single fiber zone at a midpoint along the stub where single fibers from the cable are separated from each other. At least a portion of the single fiber zone is located in the series of trays.

DETAILED DESCRIPTION OF THE PREFERRED EMBODIMENT OF THE PRESENT INVENTION

Figure 1:
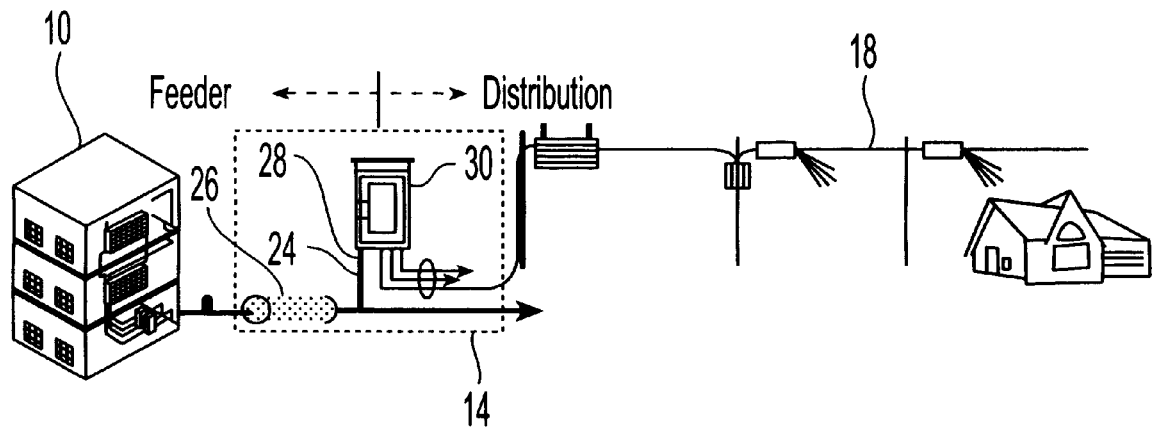
FIG. 1 is a schematic diagram of an example network incorporating an embodiment of the present invention.

With reference to FIG. 1, a network application incorporating the present invention is shown. A telephone company central office is shown as 10 from which a backbone ring cable, shown as feeder cable 14, is run. Distribution networks 18 branch off of feeder cable 14 to provide telecommunication links to subscribers 22. In the shown network, a tapered portion 24 of the feeder cable is tapered off at a splice closure 26. A separate jacketed cable 28 extends from splice closure 26 to an interconnect cabinet 30 that is one aspect of the present invention. Distribution cables 20 extend from interconnect cabinet 30 into distribution network 18.

Because the depicted application envisions interconnect cabinet 30 being above ground while tapered portion 24 of feeder cable 14 is below ground, a separate jacketed cable 28 would most likely be needed. However, tapered portion 24 and interconnect cabinet 30 can be located such that a separate jacketed cable 28 would not be needed. In such a case, splice closure 26 may not be necessary. For purposes of this patent, the modifier "feeder" will refer to the cable, complements or fibers that are entering the interconnect cabinet from the central office side of the network regardless of whether there are any separate jacketed cables interposed between the actual backbone cable and the interconnect cabinet. The modifier "distribution" will refer to cable, complements or fibers that enter the interconnect cabinet from the subscriber side of the network. However, it should be understood that the present invention could be practiced with the feeder cable installed as described for the distribution cable and the distribution cable installed as described for the feeder cable. Therefore the present invention is for interconnecting a first cable and a second cable.

The present invention can be used with any conventional fiber cable including ribbon fiber cable. Fiber cable typically includes a plurality of "complements" and each complement has multiple fibers. A complement may be, for example, a buffer tube that has up to twelve individual fibers or, as another example, a complement may be one or more ribbon fibers ganged together in a slot of a slotted core cable.

Figure 2:
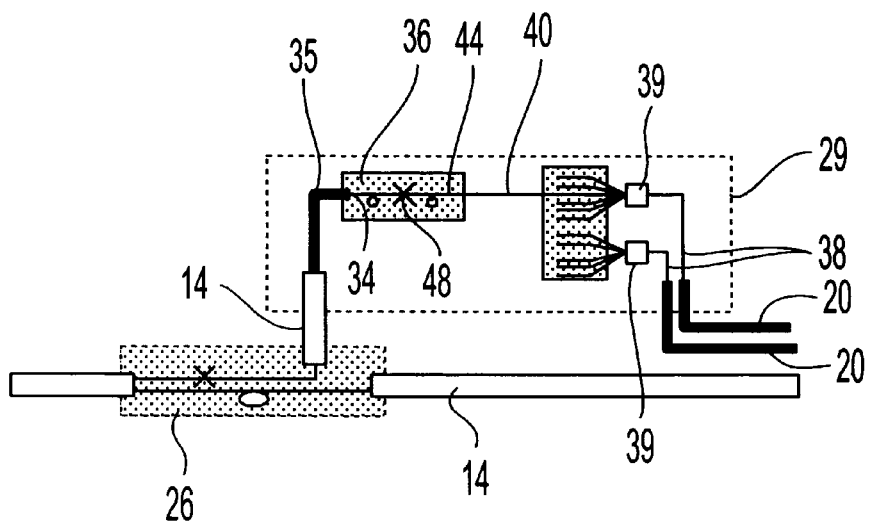
FIG. 2 is a schematic diagram of an embodiment of the interconnect platform of the present invention.
Figure 3:
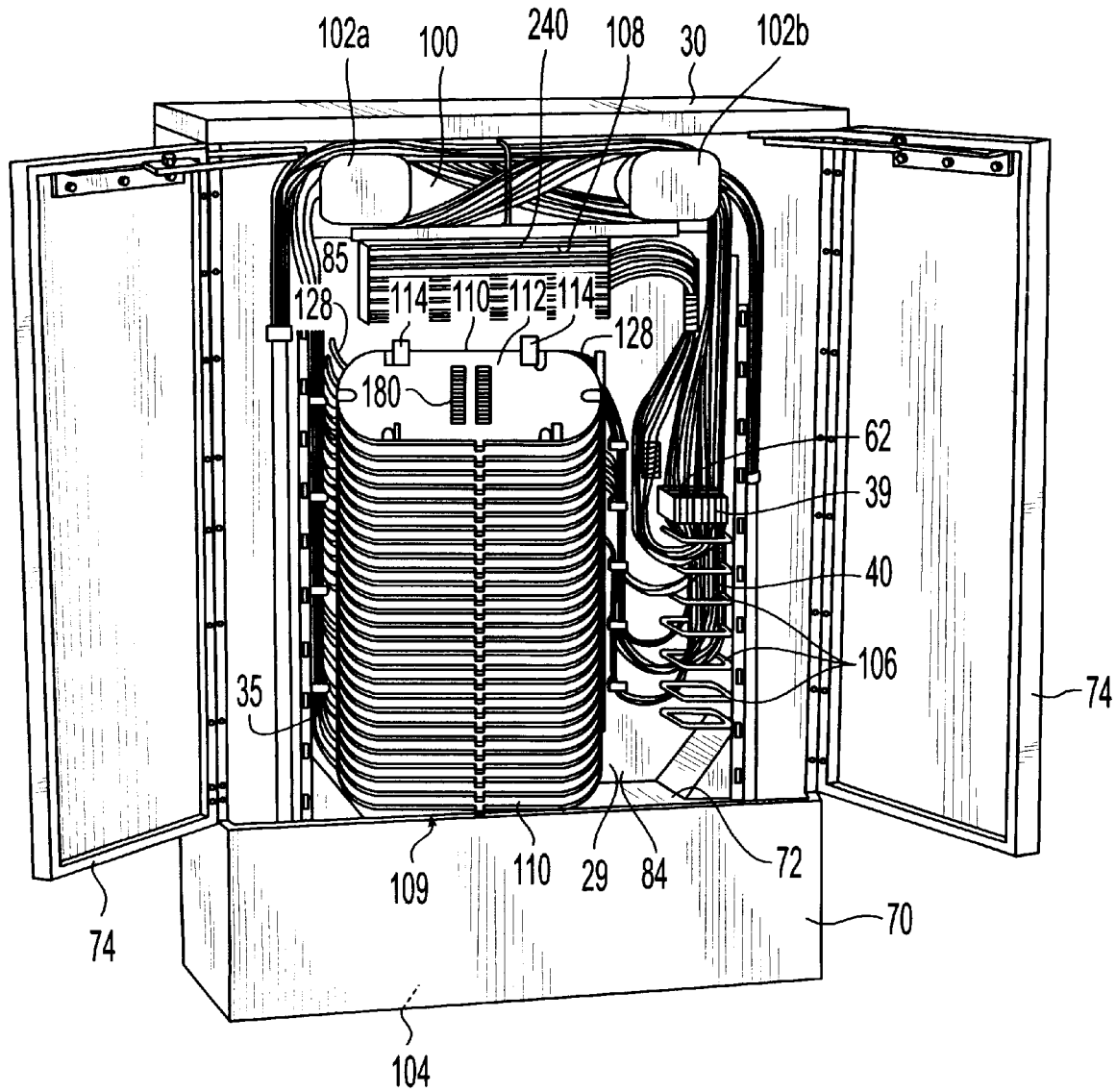
FIG. 3 is a perspective view of the preferred embodiment of the interconnect cabinet of the present invention.

FIG. 2 shows a diagram of the flexible interconnectivity of interconnect platform 29 which may be housed in a cabinet shown by example as cabinet 30 in FIG. 3 or be mounted on a frame or in some other type of closure. Feeder cable 14 enters platform 29 and a representative feeder complement 35 is shown entering joint carrier 36 and a representative individual feeder fiber 34 is routed to joint 48 also in carrier 36. Distribution cables 20 enter interconnect platform 29 and two representative distribution complements 38 are shown routed to fanout blocks 39 where fibers from one complement are fanned out and a smaller number of distribution fibers, for example one or two, are routed in distribution fanouts 40 to tray 36, and a representative distribution fiber 44 is routed to joint 48. By fanning out the distribution complements into fanouts, any distribution fiber 44 can be readily joined to any feeder fiber 34 without regard to the complement that the distribution fiber is from and as such further allows ready configuration of the interconnections on a fiber to fiber basis as opposed to a complement to complement basis.

In some networks, fibers are routed to subscribers in pairs such that the pair of fibers would never need to be separated. In such networks, fiber pairs can just as easily be substituted in the distribution fanouts 40 as opposed to a single fiber and there will be no loss of flexibility. Thus "fiber to fiber" flexibility may also refer to "fiber pair to fiber pair" flexibility depending on the network.

Figure 4:
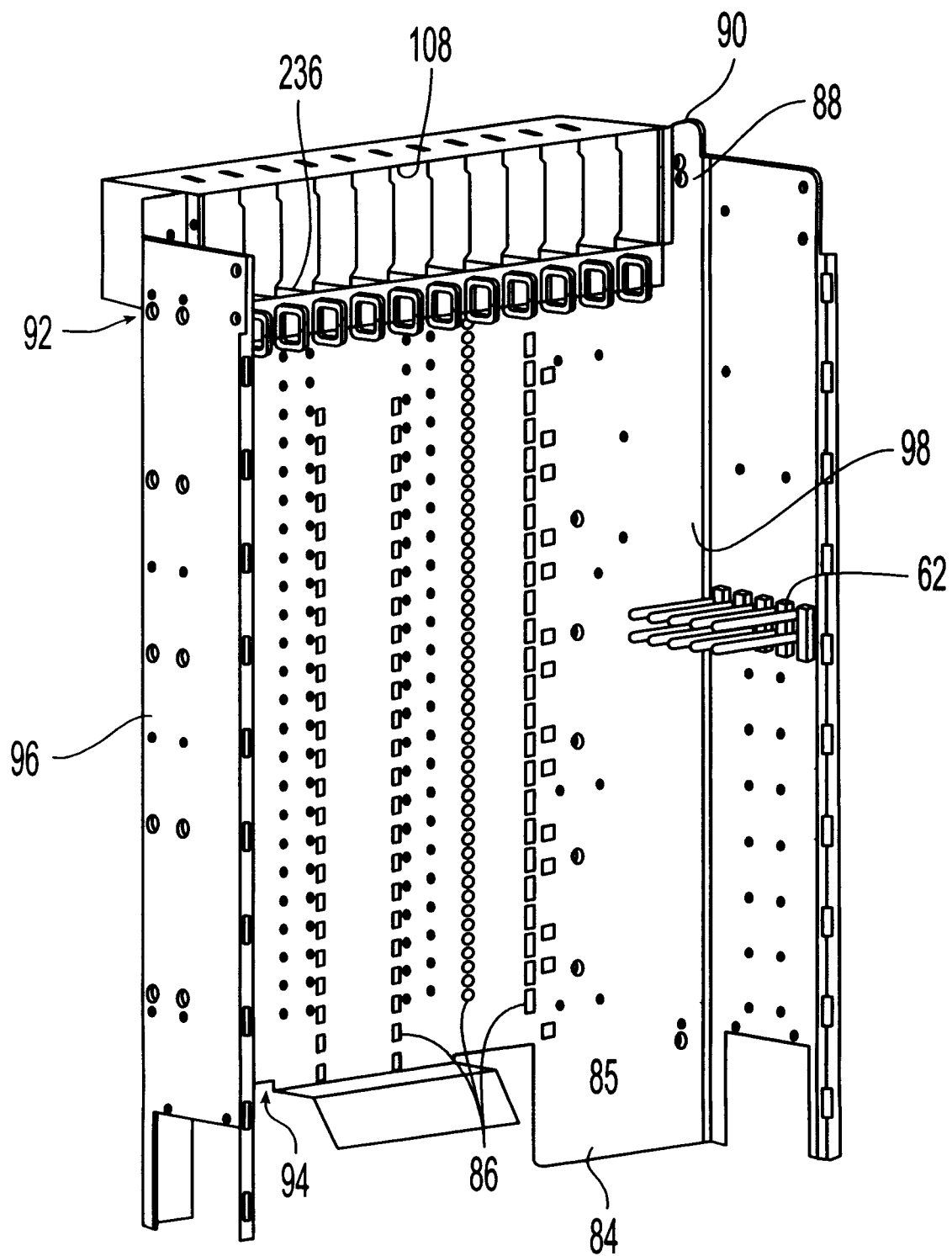
FIG. 4 is a perspective view of the preferred embodiment of the panel used in the present invention.

With reference to FIGS. 3–4, the preferred embodiment of interconnect platform 29 is shown. In this embodiment, interconnect platform 29 is housed in cabinet 30 which has outer housing 70 that defines interior 72 and that has doors 74 which provide access to interior 72. Cables are brought into cabinet 30 through the bottom and the sheath is clamped and the strength member bonded at a point inside the cabinet that is accessible through access panels (not shown) on each side of housing 70.

Mounted in housing 70 is interconnect frame 84. Frame 84 is shown as sheet metal panel 85. Panel 85 has front surface 88 facing toward doors 74 and back surface 90 opposite thereto. Panel 85 also has top 92, bottom 94, first side 96 and second side 98 opposite thereto. Interconnect frame 84 may be assembled from frame pieces instead of a panel as the purpose of frame 84 is to hold various items.

Located above panel 85 is complement management panel 100 with complement slack spools 102a on the left and 102b on the right. Located below panel 85 is complement storage area 104.

Figure 7:
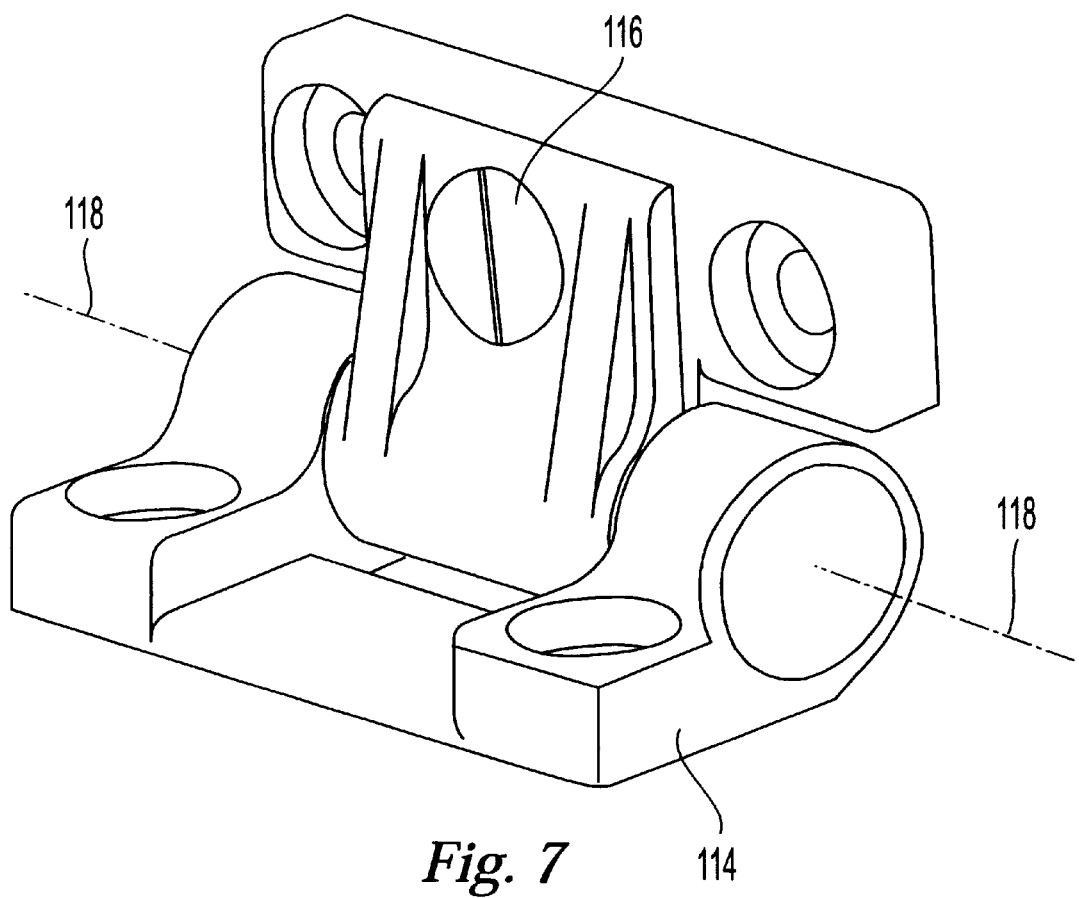
FIG. 7 is a perspective view of the preferred embodiment of the friction hinge used to mount the trays to the panel in the present invention.

Mounted on panel 85 is a series of carriers 110 which are shown, by example, as column 109 of trays 112. Each tray 112 is mounted to panel 85 by a pair of hinges 114 (shown in FIG. 7) that are preferably self-supporting hinges, for example, friction hinges sold by Southco. The friction in the pivoting of these hinges can be adjusted by set screw 116 so that a pair of hinges 114 can hold a fully loaded tray 112 cantilevered at any angle with respect to panel 85. Hinges 114 define pivot axis 118 about which tray 112 is raised and lowered. Pivot axis 118 is horizontal in this embodiment and parallel with the plane of panel 85.

Figure 8:
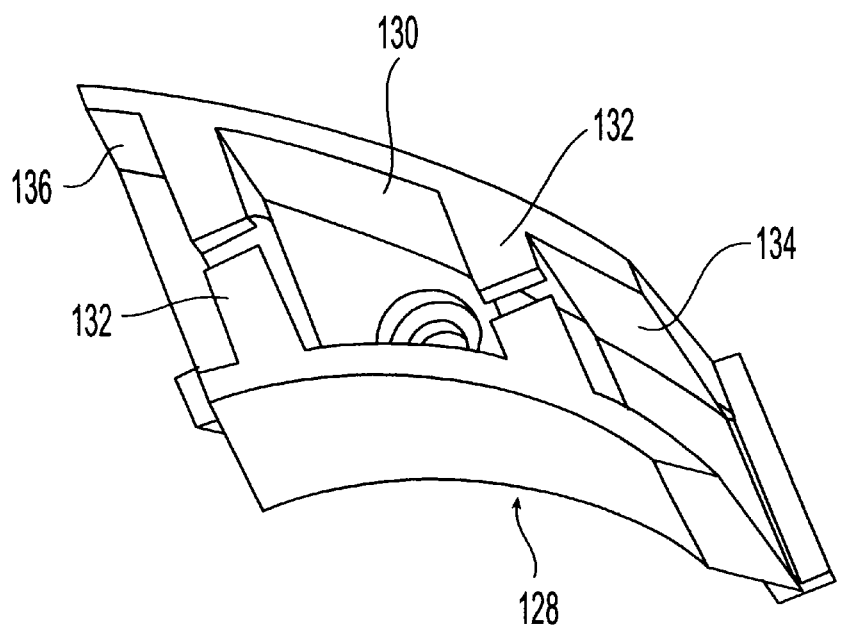
FIG. 8 is a perspective view of the preferred embodiment of the fiber guide used in the present invention.
Figure 9:
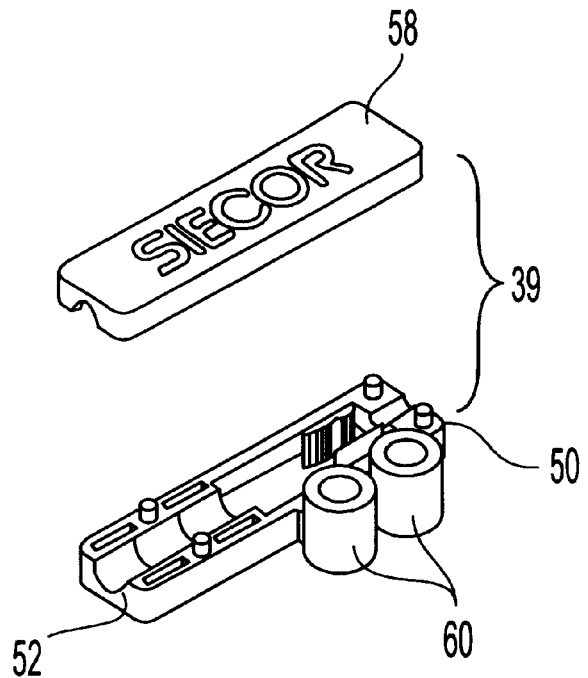
FIG. 9 is an exploded perspective view of the preferred embodiment of the fanout blocks used in the present invention.

In order to route feeder complements 35 and distribution fanouts 40 into trays 112, fiber guides 128 (shown in more detail in FIG. 8) are mounted in two columns 113a,b on panel 85 outside of where hinges 114 are mounted on panel 85. Fiber guides 128 are shown by example as molded channels 130 with overhanging tabs 132 that extend over channels 130 which help retain fibers in the channels after they are worked into the channel around the overhanging tabs 132. Channels 130 are curved with an entry end 134 curved toward the direction from which the fiber will be coming and exit end 136 which is in line with a corresponding pivot axis 118. As will be explained in more detail, by having exit end 136 in line with pivot axis 118, tray 112 can be designed so that fibers enter the tray along the axis of pivot such that pivoting of the tray does not appreciably move the fiber.

When fiber guides 128 are attached to panel 85 in column 113a, curved entry ends 134 of channels 130 are located to the outside of panel 85 (first side 96) and oriented upward because in the preferred embodiment of cabinet 30, feeder fiber complements 35 come down from the top of housing 70. When fiber guides 128 are attached to panel 85 in column 113*b*, curved entry ends 134 are located to the outside of panel 85 (second side 98) and are oriented downward because distribution fanouts 40 come up to trays 112 from being routed around fanout hoops 106. As can be seen in the preferred embodiment, regardless of the column that fiber guides 128 are located in, curved entry ends 134 are located to the outside relative to straight exit ends 136. However, it should be understood that fiber guides 128 may be configured and located as desired to accommodate whatever fiber routing is desired to carriers 110.

Figure 10:
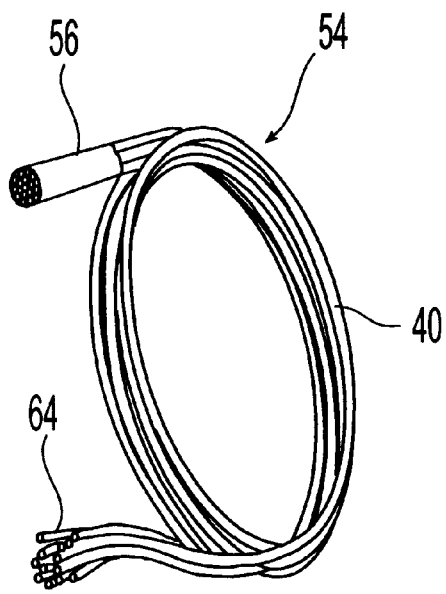
FIG. 10 is a perspective view of a representative fanout assembly that may be used in the present invention.
Figure 11:
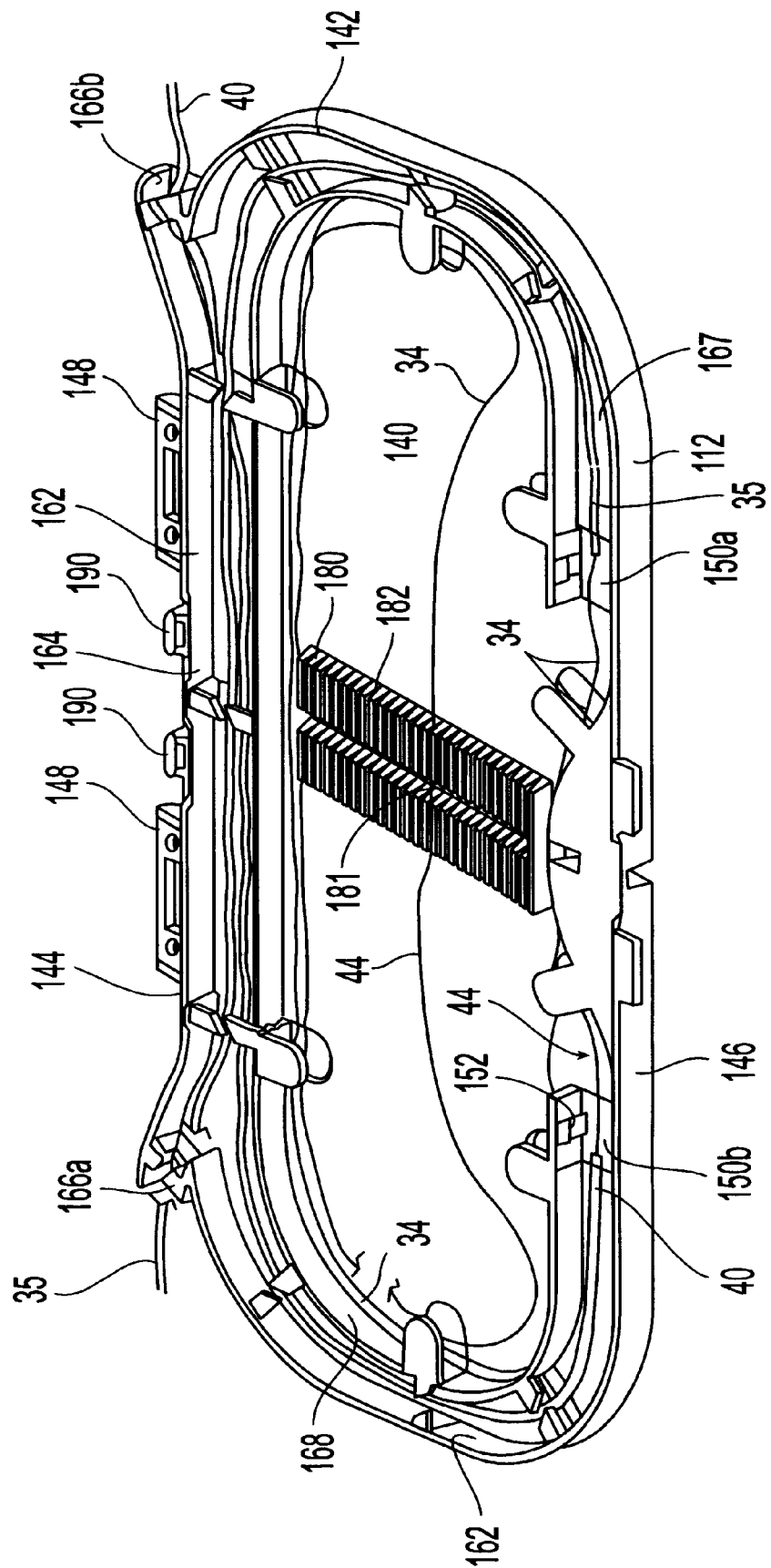
FIG. 11 is a perspective view of the tray used in the preferred embodiment of the present invention.

An array of fanout blocks 39 is mounted on the second side 98 of panel 85 below which is located a series of large fanout hoops 106. The fanout blocks 39 and hoops 106 are spaced sufficiently from the right side of trays 112 to permit routing of distribution fanouts 40 from below fanout blocks 39 and over to trays 112 taking into account the minimum bend radius of fiber. With reference to FIGS. 10–11, the preferred embodiment of fanout block 39 and fanouts 40 is shown. The "Buffer Tube Fan-Out Kit" part number FDI-FAN-OD45 available from Siecor Corporation is the preferred fanout block. Fanout blocks 39 transition one complement to several fanout tubes that either hold a single fiber or a pair of fibers from the complement depending on the network. Blocks 39 have complement end 50 for receiving a feeder complement and fanout end 52 for accommodating fanout assembly 54 of FIG. 10. Fibers from the complement are threaded through the desired fanouts 40 of assembly 54. Fanouts 40 allow for ready routing and protection of the fiber. Assembly 54 has bound end 56 that is received in fanout end 52 of block 39 and each fanout 40 has tube end 64. Fanning out fibers from complements into fanout tubes inside blocks like block 39 is known in the art. Block 39 also has lid 58 for closing over the transition from complement to fanout assembly 54 and mounting rings 60 that allow a series of blocks 39 to be slid on mounting rods 62 (shown in FIG. 4).

Fiber storage area 108 is located on panel 85 and above column 109 of trays 112. Fiber storage area 108 is for storing unused distribution fibers for future deployment. As is typical in a fiber network, the ratio of distribution fibers to feeder fibers may be around 2:1. As such, it is preferred that the unused distribution fibers be readily stored and easily movable to be connected to a feeder fiber when the need arises.

Figure 12:
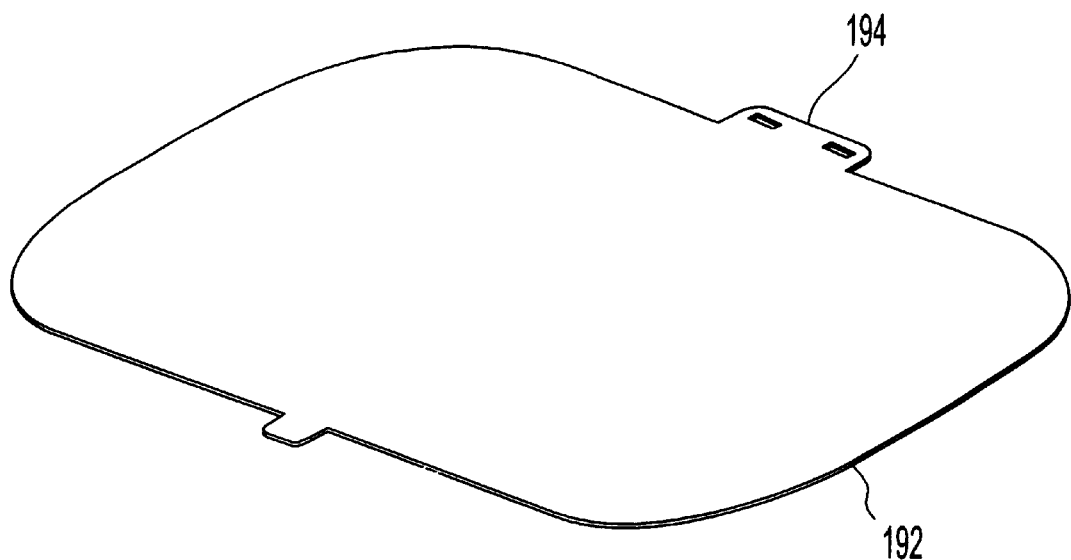
FIG. 12 is a perspective view of the lid used with the tray of FIG. 11.
Figure 13:
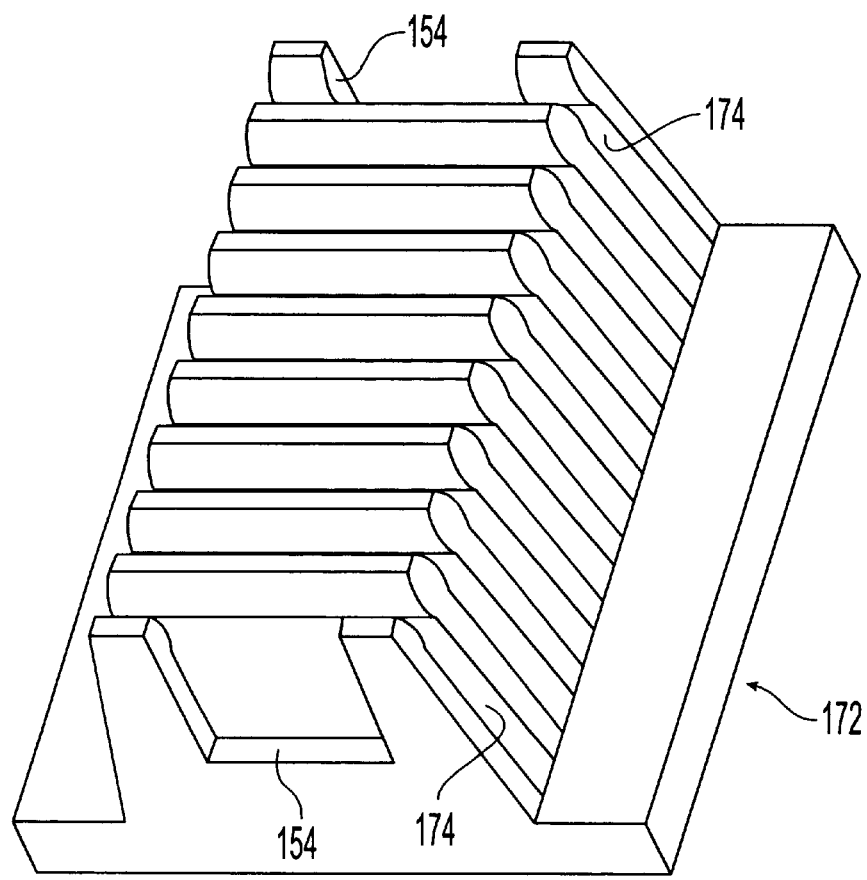
FIG. 13 is a perspective view of the strain relief used in the tray of FIG. 11.

With reference to FIGS. 11–13, the preferred embodiment of trays 112 is shown. Tray 112 is generally flat with bottom wall 140 and outer wall 142 extending up therefrom. Tray 112 has attachment side 144 and free side 146 opposite thereto. Hinges 114 are mounted on hinge mounts 148 on attachment side 144. Tray 112 has an outer channel 162 that extends around the inside of outer wall 142. Outer channel 162 has rear portion 164 that has entrances 166*a, b* opposite each other. Entrances 166*a, b* are located in line with exit ends 136 of channels 130 of fiber guides 128 when tray 112 is mounted on panel 85. Entrances 166*a, b* are also in line with pivot axis 118. Accordingly, when a fiber is routed from fiber guide 128 which is fixed on panel 85 to tray 112 which can pivot relative to panel 85, the fiber enters the tray along pivot axis 118 for some distance before turning away from pivot axis 118 such that pivoting of tray 112 will not appreciably move the fiber. As can be seen, if the fiber were to enter tray 112 at an angle relative to pivot axis 118, the fiber would be bent and unbent as tray 112 was raised and lowered. It is preferred that such bending of the fiber be avoided.

Outer channel 162 also has front portion 167 that opens to interior 168 of tray 112. Inner wall 170 separates outer channel 162 from interior 168. Interior 168 receives feeder fibers and distribution fibers and stores slack of such fibers. Slack is needed to allow easy removal and access to the fiber ends from tray 112 and then replace them in tray 112.

Joint holder 180 is located in interior 168 of tray 112 on bottom wall 140. Holder 180 has a series of grooves 182 sized to receive a packaged splice of two fiber ends. Various holders 180 can be used depending on the type of joint to be used between two fibers. For example, connectors may be used to join fibers, in which case, adapters to receive the connectors could be located in tray 112 or some other suitable carrier 110. An additional example is a holder designed to hold mass splices that are used with ribbon fiber cable.

Tray 112 also has strain relief locations 150 a and b that receive a strain relief 172 shown in FIG. 13. Inner wall 170 has catches 152 that snap over cutouts 154 on the ends of strain relief 172. Feeder strain relief 172 is preferably a plastic piece with a series of flaps 173 defining grooves 174 sized to receive either the end of a feeder complement 35 or fanout 40 friction pressed therein. Flaps 173 have broadened ends 176 to help retain any complement of fanout pressed therein. Because strain relief 172 is a removable insert, various designs of strain relief can be interchanged and inserted in tray 112 to accommodate the variety of complements and fanouts. For example, a strain relief insert may be structured to accommodate ribbon fiber complements.

Tray 112 also has lid pins 190 located at attachment side 144 for pivoting attachment of lid 192. Lid 192 is generally planar and has extension 194 that is configured to snap fit over lid pins 190.

Figure 5:
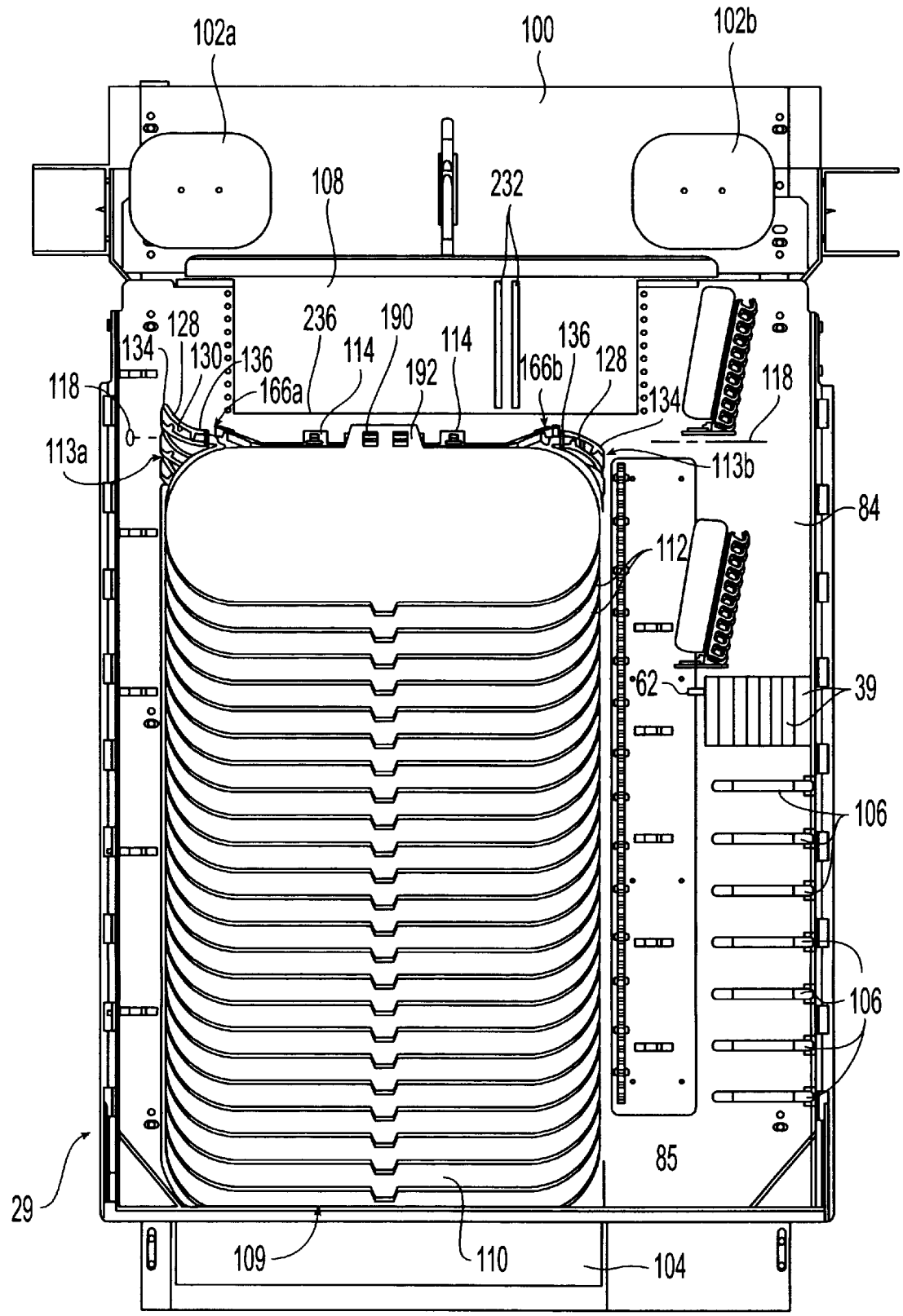
FIG. 5 is a perspective view of the preferred embodiment of the panel used in the present invention with trays installed thereon.
Figure 6:
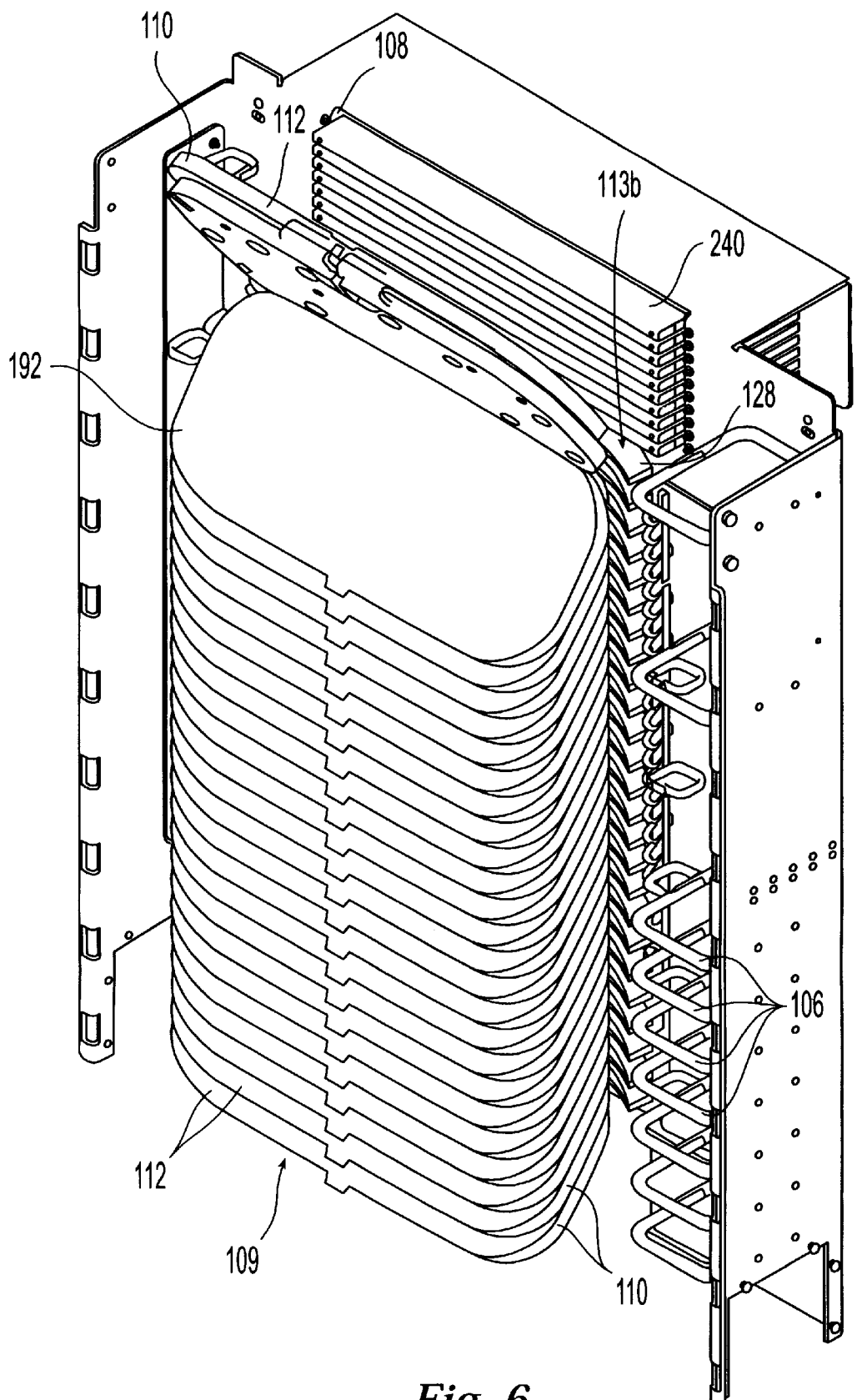
FIG. 6 is a perspective view of the preferred embodiment of the panel used in the present invention with two trays pivoted up and with storage cassettes installed thereon.

As can be seen in FIGS. 3 and 5–6, trays 112 preferably hang at a downward angle overlapping each other. In the preferred embodiment, the trays hang downward at approximately a 50 degree angle down from the horizontal and can be pivoted to a 50 degree angle upward from the horizontal. With such overlapping at an angle, the depth of column 109 of trays 112 is significantly reduced and while still allowing ready access to the trays. Specifically, when a tray 112 somewhere in the middle of column 109 needs to be accessed, all the higher trays are raised and hinges 114 retain the higher trays at the angular position to where they are raised. Lid 192 of that tray 112 is then pivoted up to access interior 168 of tray 112.

In an alternative embodiment, a holder may be used to support the higher trays when accessing a tray. As another alternative, lids 192 can be structured to support trays above them by having its outer edge placed under a catch on the underside of the tray immediately above it. As such, the weight of the trays above the accessed trays is transferred to lid 192 which transfers the weight to the lid pins 190 which are located relative to hinges 114 such that no appreciable moment is created about hinges 114 so as to cause the accessed tray to pivot. When the accessed tray is no longer needed, lid 192 is simply disengaged from the catch and lid 192 and the higher trays are lowered back down to their original location.

In yet another alternative embodiment, the series of trays 112 can be in a row format as opposed to the column format and hang by a vertical axis. Essentially, the arrangement of panel 85 can simply be rotated ninety degrees to create a row format. However, the column format is preferred because of easier access to the interior of trays 112.

Fiber storage area 108 is used to hold the ends of distribution fibers that are to be saved for later deployment.

Figure 14:
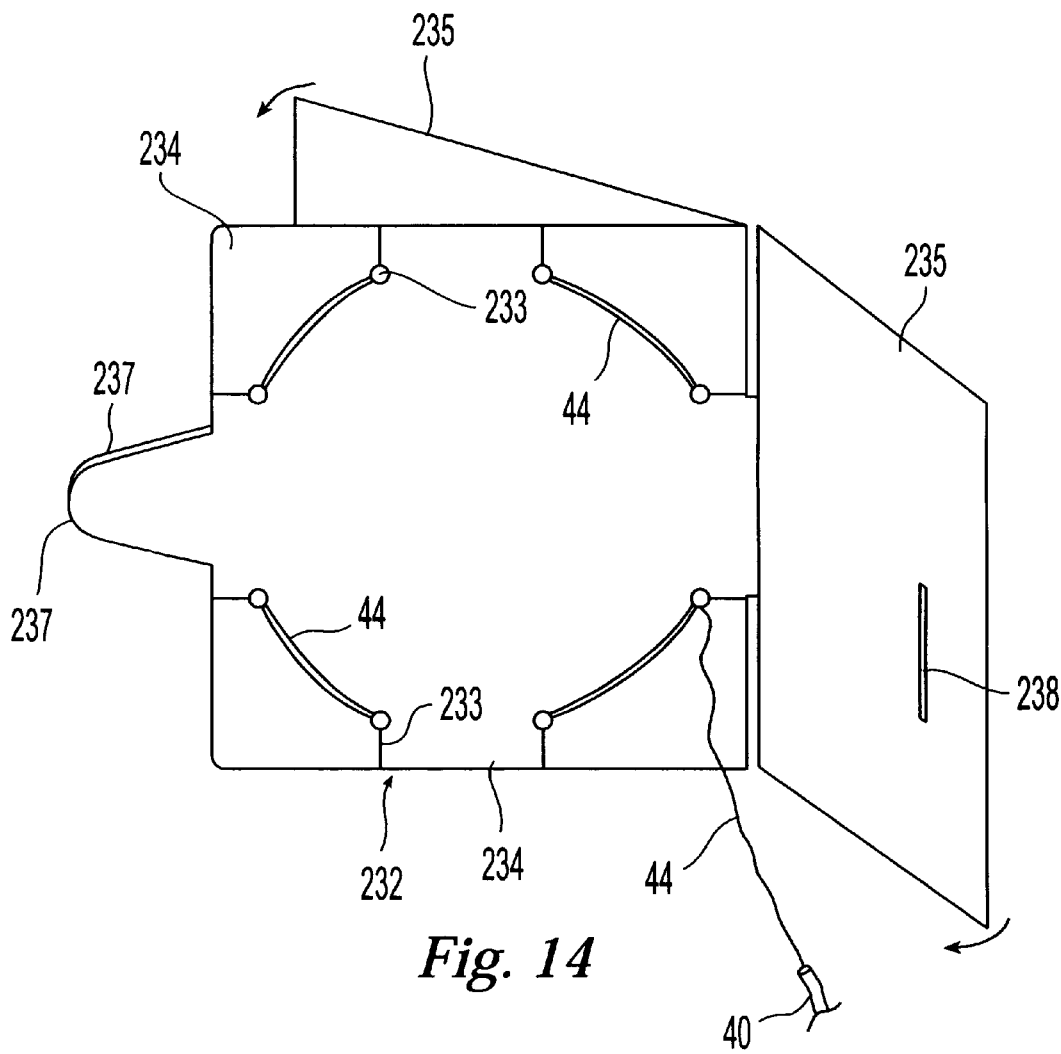
FIG. 14 is a perspective view of the card used to store fibers in the present invention.

Any of a variety of storage trays or other items may be located in this area to accomplish such storage. In the preferred embodiment with reference to FIGS. 5 and 14, storage cards 232 are used for each individual distribution fiber (or pair of fibers if the network uses fiber pairs). Each fiber of pair of fibers 44 is wound in a circle through slits 233 formed between tabs 234 of card 232 and then protective flaps 235 are folded over each side of card 232 and tab 237 is inserted into slots 238 on flaps 235 to hold flaps 235 closed over the circle of fiber 44 to help protect fiber 44. Card 232 is placed vertically on shelf 236 in storage area 108. When a stored fiber is later needed, card 232 is removed from shelf 236 and the fiber is unwound from card 232 and that fibers fanout 40 is routed through the appropriate hoops 106 to the desired tray 112 and the fiber 44 is routed around inside tray 112 until the end of the fiber terminates at joint holder 180. In an alternative embodiment for storage area 108 shown in FIGS. 3 and 6, storage cassettes 240 can be used to store a plurality of fibers and the cassettes stacked horizontally in storage area 108.

The preferred installation of fiber in interconnect cabinet 30 will now be described. A predetermined length of the sheath of the feeder cable and distribution cable is stripped back from the cable ends to expose the complements of the cable. This length will depend on the size of panel 85 and other components in cabinet 30 and readily determined by accounting for the routing path and appropriate slack storage. The end of the sheath of the feeder cable is routed up through the left side of cabinet 30 and clamped and its strength member bonded at the left side of interconnect panel 85. Feeder complements 35 are extended upward to complement management panel 100 and routed around slack spools 102 back to the left side of cabinet 30 where they are directed downward alongside the left side of trays 112. Each feeder complement is routed to a respective tray 112 through that tray's corresponding fiber guide 128. With reference to FIG. 11, a representative feeder complement 35 is routed through entrance 166a and into outer channel 162 and terminates at strain relief location 150a in front portion 167 of outer channel 162. At strain relief location 150a, representative feeder fiber 34 extends into interior 168 of tray 112 in a clockwise fashion and terminates at joint holder 180.

The end of the sheath of the distribution cables is routed up through the right side of the cabinet 30 and clamped and its strength member bonded at the right side of panel 85. Distribution complements 38 are extended upward to complement management panel 100 and routed around slack spools 102 back to the right side of panel 85 where they are directed down to the array of fanout blocks 39. Distribution fanouts 40 extend down from fanouts blocks 39 and are turned upward around the appropriate fanout hoop 106 depending on where the fanout 40 is to be terminated. Fanouts 40 that are to be stored for later deployment are routed around the fanout hoop 106 closest to fanout blocks 39 and routed up to fiber storage area 108 for suitable storage.

Fanout blocks 39 and fanout hoops 106 are located relative to each other and to column 109 of trays 112 such that all distribution fanouts can be the same length yet be routed to any tray or the storage area and have their slack appropriately managed. For example, a fanout 40 that is to be routed to the lowest tray 112 is routed through all hoops 106 and then over and up into guide 128 on the right side of the lowest tray 112. However, a fanout 40 that is to be routed to the uppermost tray is routed through two hoops 106 before being turned upward and to guide 128 of the uppermost tray 112. As can be seen the series of hoops 106 is located such that equal length fanouts 40 can be appropriately managed to terminate at any tray 112. This equal length fanout feature contributes to the fiber to fiber flexibility of the present invention that allows any distribution fiber to be joined to any feeder fiber regardless of the complement in which the fiber is located.

With reference to FIG. 11, a representative fanout 40 that is to be terminated in a tray 112 is routed through entrance 166b into outer channel 162 and terminated at strain relief location 150b in front portion 167 of outer channel 162. At strain relief location 150b, a representative distribution fiber 44 extends into interior 168 of tray 112 in a counter-clockwise fashion and terminates at joint holder 180.

With the feeder fibers and distribution fibers so installed, opposed pairs of fibers may now be joined and the resulting joints 181 located in tray 112. The slack of the fibers that is wound in the interior of trays 112 allows the opposed pairs to be removed from the trays and placed in a fusion splicer, joined, and then the resulting joint located in joint holder 180.

Reconfiguration of fibers in the present invention is readily achieved. If a distribution fiber from the top tray 112 is to be moved to the lowest tray 112, the top tray is accessed as described above, the distribution fiber is cut from its joint, the fiber and fanout are "unrouted" or removed from the tray and rerouted through the appropriate hoops 106 and over to the lowest tray. Any reconfiguration is possible in view of the fiber to fiber flexibility of the fanouts 40.

Figure 15:
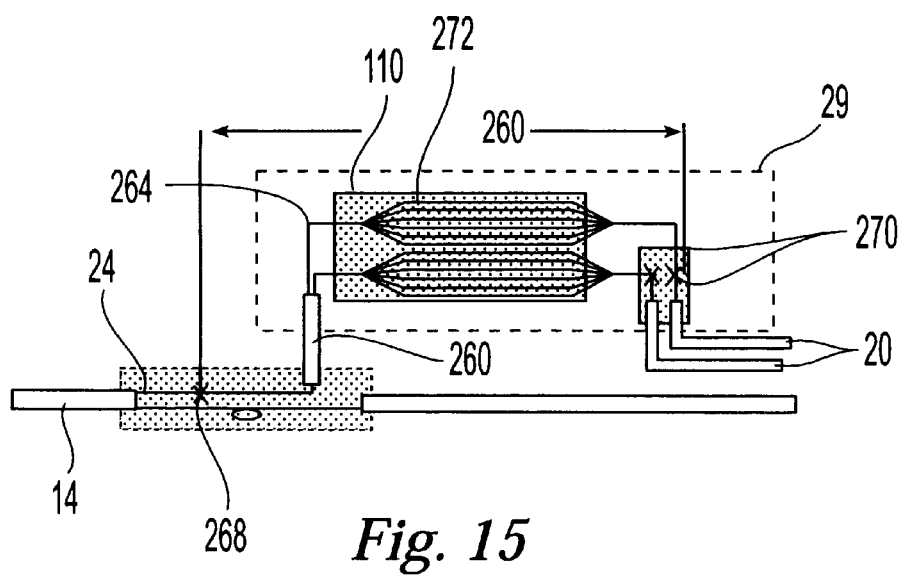
FIG. 15 is a schematic diagram depicting an alternative embodiment of the present invention having a stubbed interconnect platform.

With reference to FIG. 15 an alternative embodiment of the present invention is shown where interconnect platform 29 is stubbed. This particular embodiment may be found particularly useful in applications where ribbon fiber is used that can be mass fusion spliced together; however, it may be used in single fiber applications as well. Instead of having joints located in carriers 110, the fiber is continuous through the tray due to use of stub 260. Stub 260 in this embodiment is a ribbon fiber cable 262 that has complements 264 of ribbon fibers 266. Stub 260 has feeder end 268 that extends outside housing 70 for a desired length to reach tapered portion 24 of feeder cable 14. Feeder end 268 can be mass fusion spliced to tapered portion 24 as is known in the art for ribbon fiber. Stub 260 also has distribution end 270 that where distribution cables 20 can be mass spliced onto distribution end 270.

Stub 260 also has single fiber zone 272 where the fibers of stub 260 are not in ribbon form so that they can be readily accessed. If the network needs to be reconfigured, the desired single fiber is cut and the distribution side of the fiber is moved to the desired location and joined to the feeder side of a second cut fiber. With such an embodiment, the initial installation of the interconnect platform in the network is simplified yet it remains readily reconfigureable. This stubbed embodiment is preferably structured with trays and fanouts just as in the preferred embodiment but the key distinction is that single fibers run continuous through carriers 110 as opposed to having joints between two different fibers. In such an embodiment there is no joint within interconnect platform 29 until there is a later reconfiguration.

While the preferred embodiment has been described in the context of mounting interconnect platform 29 in a cabinet, it should be understood that platform 29 can be readily mounted on a frame or housed in a closure. The location of fanout blocks 39 and fanout hoops 106 relative to each other and to series of carriers 110 can be rearranged as the application dictates as long as any fanout can be routed to any carrier 110 and have its slack appropriately managed. For example, in a closure application where space is more restricted, fanout blocks 39 and hoops 106 may be placed on the back of interconnect frame 84 and located such that any fanout can still be routed to any carrier 110. Such an arrangement could reduce the width of frame 84 an make it more suitable for a closure application.

Although the present invention has been described with respect to certain embodiments, various changes, substitutions and modifications may be suggested to one skilled in the art and it is intended that the present invention encompass such changes, substitutions and modifications as fall within the scope of the appended claims.

We claim:

1. In an optical fiber telecommunications network, a method of interposing a readily rearrangeable interconnection point between a first fiber cable and a second fiber cable, comprising the steps of:

(a) routing an end of the first fiber cable to a panel, the first fiber cable having a plurality of first fiber complements and each first fiber complement having a plurality of first fibers;

(b) routing a series of subsets of the plurality of first fiber complements to a corresponding series of trays mounted on the panel;

(c) routing the first fibers of each subset to joint locations in the subset's respective tray;

(d) routing an end of the second fiber cable to the panel, the second fiber cable having a plurality of second fiber complements and each second fiber complement having a plurality of second fibers;

(e) fanning out the second fibers from the second fiber complements to create equal length fanout tubes containing at least one fiber;

(f) routing at least a first portion of the fanout tubes to the series of trays;

(g) routing the second fibers in the first portion of fanout tubes to joint locations in the tray;

(h) joining the first portion of the second fibers to corresponding first fibers to create fiber joints; and (i) locating the fiber joints in the trays.

2. The method of claim 1 further comprising the step of routing a second portion of the fanout tubes to a storage area at the panel to be stored for later deployment.

3. The method of claim 1 wherein the step of joining the first portion of the second fibers to corresponding first fibers comprises the step of fusion splicing the fibers together.

4. The method of claim 1 wherein the trays are pivotally attached to the panel defining a pivot axis of the tray.

5. The method of claim 4 wherein the step of routing the series of subsets of first fiber complements to a corresponding tray further comprises routing the first fiber complement into the tray substantially in line with the pivot axis of the tray.

6. The method of claim 5 wherein the step of routing the first portion of fanout tubes to the series of trays further comprises routing the first portion of fanout tubes into the tray in line with the pivot axis of the tray.

7. The method of claim 6 wherein the first portion of fanout tubes are routed into a side of the trays opposite a side of the trays to where the series of subsets of first fiber complements are routed.

8. The method of claim 4 wherein the trays hang from the panel at an angle downward overlapping each other and further comprising the step of pivoting trays upward to access trays therebelow.

9. The method of claim 1 further comprising the step of locating a series of fiber guides on the panel relative to the series of trays and relative to the point at which the second fiber complements are fanned out such that any of the equal length fanout tubes can be routed to any tray in the series of trays without unmanaged slack by routing the fanout tubes through the appropriate number of fiber guides in the series of fiber guides before routing the fanout tube to a particular tray.

10. The method of claim 1 further comprising the steps of routing and storing slack of the first fiber complements before routing the first fiber complement to the series of trays and routing and storing slack of the second fiber complements before fanning out the second fiber complements.

11. An interconnection apparatus for providing a readily rearrangeable interconnection point between a first fiber cable and a second fiber cable, each fiber cable of the type having multiple complements of multiple fibers, the apparatus comprising:

(a) a panel;

(b) a series of splice trays, each splice tray pivotally mounted to the panel defining a pivot axis;

(c) an array of fanout blocks located at the panel, each fanout block having a complement end for receiving a complement and a fanout end opposite thereto;

(d) a plurality of equal length fanout tubes extending from the fanout ends of the array of fanout blocks; and (e) a series of fiber guides located relative to the series of trays and relative to the fanout blocks such that any fanout tube can be routed to any tray without unmanaged slack by routing the fanout tube through the appropriate number of fiber guides before routing the fanout tube to a particular tray.

12. The apparatus of claim 11 wherein each splice tray has opposed entrances into the interior of the tray that are in line with the pivot axis of the tray.

13. The apparatus of claim 12 wherein the series of splice trays are arranged in a columns hanging at a downward angle from the panel overlapping each other and the trays are pivotable upward to allow access to trays therebelow.

14. The apparatus of claim 13 wherein each of the trays is mounted to the panel with at least one self-supporting hinge that supports the tray at any angular position that the tray is pivoted to.

15. The apparatus of claim 12 wherein each tray further comprises a joint holder for retaining joints made between opposed fibers.

16. The apparatus of claim 11 further comprising a complement management panel for storing slack lengths of complements from the cables.

17. The apparatus of claim 11 further comprising a storage area on the panel for receiving the ends of fanout tubes that are to be stored for later deployment.

* * * * *